US012784740B2

(12) United States Patent
Huang et al.

(10) Patent No.: US 12,784,740 B2
(45) Date of Patent: Nov. 3, 2026

(54) DIFFUSION MODELS FOR GENERATION OF AUDIO DATA BASED ON DESCRIPTIVE TEXTUAL PROMPTS

(71) Applicant: Google LLC, Mountain View, CA (US)

(72) Inventors: Qingqing Huang, Palo Alto, CA (US); Daniel Sung-Joon Park, Hoboken, NJ (US); Aren Jansen, Mountain View, CA (US); Timo Immanuel Denk, Zürich (CH); Yue Li, Mountain View, CA (US); Ravi Ganti, Santa Clara, CA (US); Dan Ellis, New York, NY (US); Tao Wang, Sunnyvale, CA (US); Wei Han, Redwood City, CA (US); Joonseok Lee, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 18/651,296

(22) Filed: Apr. 30, 2024

(65) Prior Publication Data

US 2024/0282294 A1 Aug. 22, 2024

Related U.S. Application Data

(63) Continuation of application No. PCT/US2024/013191, filed on Jan. 26, 2024.

(Continued)

(51) Int. Cl.
*G10L 15/06* (2013.01)
*G06F 40/40* (2020.01)

(Continued)

(52) U.S. Cl.
CPC ............ *G10L 15/063* (2013.01); *G06F 40/40* (2020.01); *G10H 1/0025* (2013.01); *G10L 15/16* (2013.01); *G10H 2210/111* (2013.01)

(58) Field of Classification Search
CPC ....... G10L 15/063; G10L 15/16; G10L 13/02; G10H 1/0025; G10H 2240/081;

(Continued)

(56) References Cited

U.S. PATENT DOCUMENTS 10,331,402 B1 * 6/2019 Spector ............... G10L 15/1815
2011/0144997 A1 * 6/2011 Mizuguchi .............. G10L 13/06 704/258

(Continued)

FOREIGN PATENT DOCUMENTS

CN 114023300 2/2022

OTHER PUBLICATIONS

International Preliminary Report on Patentability for Application No. PCT/US2024/013191, mailed Aug. 7, 2025, 16 pages.

(Continued)

*Primary Examiner* — Michael Colucci

(74) *Attorney, Agent, or Firm* — DORITY & MANNING, P.A.

(57) ABSTRACT

A corpus of textual data is generated with a machine-learned text generation model. The corpus of textual data includes a plurality of sentences. Each sentence is descriptive of a type of audio. For each of a plurality of audio recordings, the audio recording is processed with a machine-learned audio classification model to obtain training data including the audio recording and one or more sentences of the plurality of sentences closest to the audio recording within a joint audio-text embedding space of the machine-learned audio classification model. The sentence(s) are processed with a machine-learned generation model to obtain an intermediate representation of the one or more sentences. The intermediate representation is processed with a machine-learned cascaded diffusion model to obtain audio data. The machine- (Continued)

learned cascaded diffusion model is trained based on a difference between the audio data and the audio recording.

20 Claims, 7 Drawing Sheets

Related U.S. Application Data

(60) Provisional application No. 63/481,746, filed on Jan. 26, 2023.

(51) Int. Cl.
*G10H 1/00* (2006.01)
*G10L 15/16* (2006.01)

(58) Field of Classification Search
CPC .. G10H 2250/311; G06N 3/045; G06N 3/047; G06N 3/088
See application file for complete search history.

(56) References Cited

U.S. PATENT DOCUMENTS

| | | | | |
|---|---|---|---|---|
| 2020/0075020 | A1* | 3/2020 | Howard | G06F 40/30 |
| 2021/0160547 | A1* | 5/2021 | Baughman | H04N 23/60 |
| 2021/0350786 | A1* | 11/2021 | Chen | G10L 15/063 |
| 2021/0397845 | A1* | 12/2021 | Ijaz | G06F 40/30 |
| 2022/0392637 | A1* | 12/2022 | Kollada | G16H 50/30 |
| 2023/0118966 | A1* | 4/2023 | Liu | G06F 40/30 345/473 |
| 2023/0267315 | A1* | 8/2023 | Kingma | G06N 3/088 706/16 |
| 2024/0105160 | A1 | 3/2024 | Kim et al. | |
| 2024/0220530 | A1* | 7/2024 | Wilkins | G06F 16/433 |
| 2024/0221242 | A1* | 7/2024 | Greenen | G06T 5/70 |
| 2024/0249182 | A1* | 7/2024 | Kirshenboim | G06N 3/096 |

OTHER PUBLICATIONS

Huang et al., "Noise2Music: Text-conditioned Music Generation with Diffusion Models", arXiv:2302.03917v2, Mar. 6, 2023, 15 pages.

International Search Report and Written Opinion for PCT/US2024/013191, mailed on Apr. 17, 2024, 22 pages.

Kong et al., "DiffWave: A Versatile Diffusion Model for Audio Synthesis", arXiv:2009.09761v3, Mar. 30, 2021, 17 pages.

Kreuk et al., "AudioGen: Textually Guided Audio Generation", arXiv:2209.15352v2, Mar. 5, 2023, 16 pages.

Lee et al., "NU-Wave: A Diffusion Probabilistic Model for Neural Audio Upsampling", arXiv:2104.02321v2, Jun. 17, 2021, 5 pages.

Yang et al., "Diffsound: Discrete Diffusion Model for Text-to-sound Generation", arXiv:2207.09983v2, Apr. 28, 2023, 14 pages.

Nakajima et al., "An Overview of AI Music Generation and its Potential 2022 Edition", Qosmo Inc., Jul. 2022. 42 pages.

Machine Translated Chinese Search Report Corresponding to Application No. 2024800095840 on Nov. 19, 2020.

Huang et al., "MULAN: A Joint Embedding of Music Audio and Natural Language", Proceedings of the 23rd International Society for Music Information Retrieval Conference, 2022, Bengaluru, India, 8 pages.

* cited by examiner

DIFFUSION MODELS FOR GENERATION OF AUDIO DATA BASED ON DESCRIPTIVE TEXTUAL PROMPTS

PRIORITY CLAIM

The present application is a continuation of International Application No. PCT/US2024/013191 filed on Jan. 26, 2024, which is based on and claims priority to U.S. Provisional Application 63/481,746, having a filing date of Jan. 26, 2023. Each of the aforementioned applications is hereby incorporated by reference in its entirety.

FIELD

The present disclosure relates generally to generative models. More particularly, the present disclosure relates to diffusion models trained to generate audio data based on descriptions of types of audio.

BACKGROUND

Generative models have proven to be increasingly useful in the field of machine learning. Deep generative models are used across a wide range of domains. Some types of generative models, such as diffusion models, can be trained to generate high-quality outputs in a format different than the format of the input. For example, some diffusion models can be trained to process a textual prompt to generate high quality image outputs.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors. The computing system includes a machine-learned generator model trained to generate intermediate representations of textual content. The computing system includes a machine-learned diffusion model trained to generate audio data from intermediate representations of textual content, wherein the audio data is responsive to a query described by the textual content. The computing system includes one or more non-transitory computer-readable media that store instructions that, when executed by the one or more processors, cause the participant computing device to perform operations. The operations include processing textual content with the machine-learned generator model to generate an intermediate representation of the textual content, wherein the textual content is descriptive of a query that indicates a desired type of audio content. The operations include processing the intermediate representation with the machine-learned diffusion model to obtain audio data, wherein the audio data comprises audio of the desired type of audio content.

Another example aspect of the present disclosure is directed to a computer-implemented method. The method includes generating, by a computing system comprising one or more computing devices, a corpus of textual data with a machine-learned text generation model, wherein corpus of textual data comprises a plurality of sentences, and wherein each sentence is descriptive of a type of audio. The method includes, for each of a plurality of audio recordings, processing, by the computing system, the audio recording with a machine-learned audio classification model to obtain training data comprising the audio recording and one or more sentences of the plurality of sentences closest to the audio recording within a joint audio-text embedding space of the machine-learned audio classification model. The method includes processing, by the computing system, the one or more sentences with a machine-learned generation model to obtain an intermediate representation of the one or more sentences. The method includes processing, by the computing system, the intermediate representation with a machine-learned cascaded diffusion model to obtain audio data. The method includes training, by the computing system, the machine-learned cascaded diffusion model based on a difference between the audio data and the audio recording.

Another example aspect of the present disclosure is directed to one or more non-transitory computer-readable media that store instructions that, when executed by the one or more processors, cause the participant computing device to perform operations. The operations include processing textual content with a machine-learned generator model to generate an intermediate representation of the textual content, wherein the textual content is descriptive of a query that indicates a desired type of audio content, and wherein the machine-learned generator model is trained to generate intermediate representations of textual content. The operations include processing the intermediate representation with a machine-learned diffusion model to obtain audio data, wherein the audio data comprises audio of the desired type of audio content, and wherein the machine-learned diffusion model is trained to generate audio data from intermediate representations of textual content.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
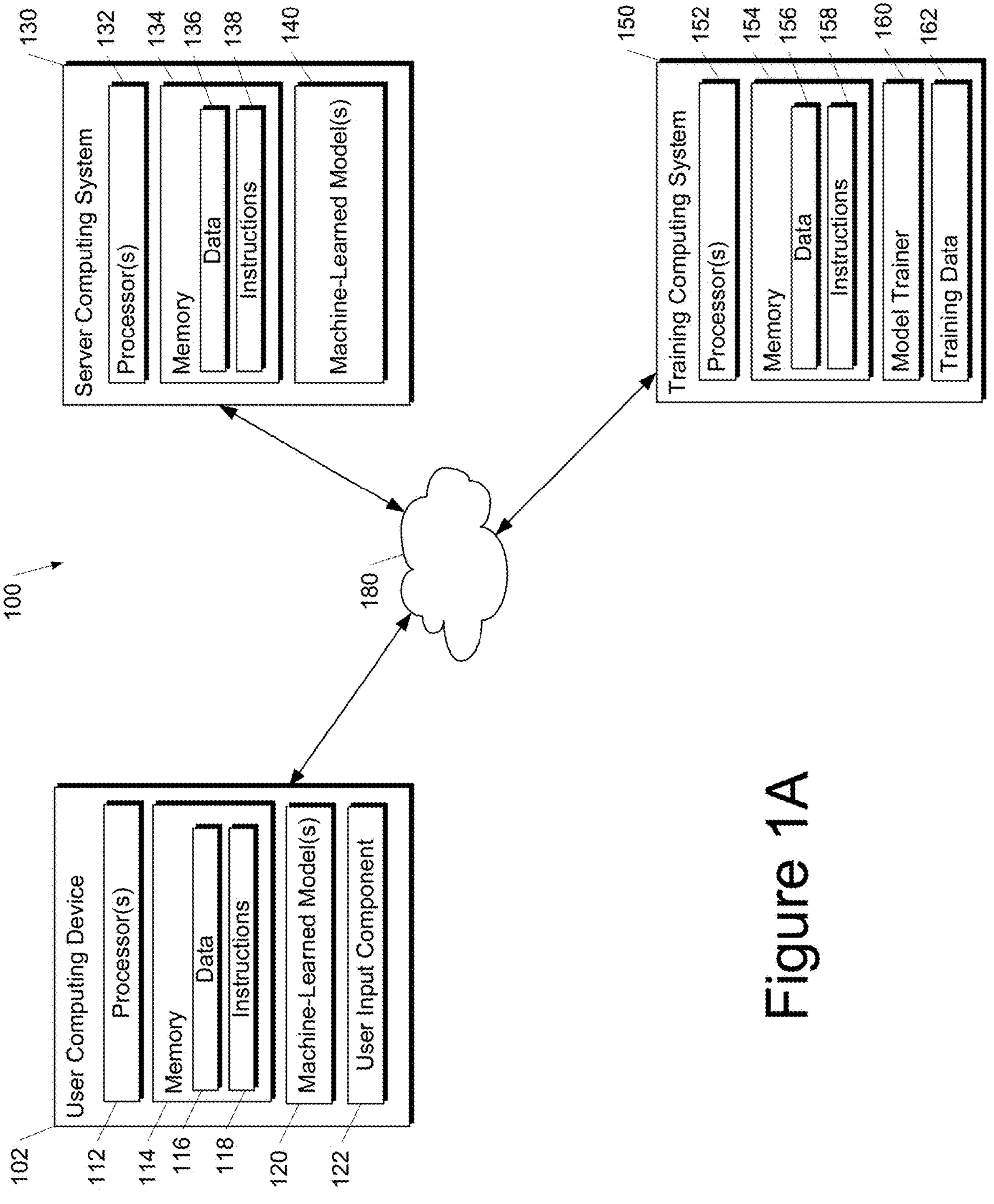
FIG. 1A depicts a block diagram of an example computing system that performs training of generative models for generation of audio data from textual content according to example embodiments of the present disclosure.

Reference numerals that are repeated across plural figures are intended to identify the same features in various implementations.

DETAILED DESCRIPTION

Overview

Generally, the present disclosure is directed to diffusion models trained to generate audio data based on descriptions of types of audio. More specifically, generative models with the capability to produce high quality audio from a different type of input, such as a textual prompt, are greatly desired. However, there are number of roadblocks to implementation of such models with a sufficient degree of accuracy. As one example, training a model to generate audio data from a textual prompt requires large quantities of textual descriptions of audio clips, which can be prohibitively difficult to extract (or generate). As another example, the architectures conventionally used for such models have generally failed to produce audio to a sufficient degree of accuracy.

Accordingly, implementations of the present disclosure propose diffusion models for generation of audio data based on descriptive textual prompts. More specifically, a computing system can obtain a large quantity of audio samples and an associated corpus of descriptive textual data. For example, the computing system can extract the audio samples from the audio data of videos hosted by an audio-visual data hosting entity, and the computing system can extract the corresponding corpus of descriptive textual data from the textual content provided by users to describe the respective audio samples (e.g., a music video and the comments provided for the music video by users). The computing system can use the audio samples and corpus of descriptive textual data to train a machine-learned audio classification model using a contrastive loss function (e.g., a joint audio-text embedding model, etc.).

The computing system can leverage the machine-learned audio classification model to train and optimize a model for audio generation. More specifically, the computing system can first generate a corpus of textual data with a machine-learned text generation model (e.g., a large language model (LLM), etc.). The corpus of textual data can include a large quantity of sentences that each describe a type of audio (e.g., "A light EDM drumbeat carries a bass guitar, strings, and a simple piano"). The computing system can also obtain a large quantity of audio recordings. The computing system can evaluate the audio recordings and the corpus of textual data with the machine-learned audio classification model to select the most accurate pairs of audio recordings and descriptive sentences for training data.

For each of the pairs of audio recordings and textual content (i.e., sentences), the computing system can first process the textual content with a machine-learned generation model to obtain an intermediate representation of the textual content (e.g., a latent representation, a low-fidelity audio sample, a spectrogram, etc.). The computing system can then process the intermediate representation with a machine-learned diffusion model to obtain audio data. The computing system can train the machine-learned diffusion model and/or the machine-learned generation model with a loss function that evaluates a difference between the audio data and the audio recording that corresponds to the textual content. In such fashion, implementations of the present disclosure can efficiently and effectively train a series of models for generation of high-quality audio samples conditioned on textual content.

Aspects of the present disclosure provide a number of technical effects and benefits. As one example technical effect and benefit, conventional generative models generally produce low quality audio data from textual prompts, or lack the capacity to produce audio data from textual content at all. Furthermore, the training of such models requires substantial quantities of compute resources (e.g., power, memory, energy, compute cycles, bandwidth, etc.). However, implementations of the present disclosure provide the capability to generate specifically tailored training data to more effectively and more efficiently train a novel architecture for the generation of high quality audio data, therefore reducing the quantity of compute resources required for training while providing the capability to generate high-quality audio from textual prompts.

With reference now to the Figures, example embodiments of the present disclosure will be discussed in further detail.

Example Devices and Systems

FIG. 1A depicts a block diagram of an example computing system 100 that performs training of generative models for generation of audio data from textual content according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, diffusion networks, or other forms of neural networks. Some example machine-learned models can leverage an attention mechanism such as self-attention. For example, some example machine-learned models can include multi-headed self-attention models (e.g., transformer models).

Specifically, in some implementations, the models 120 can be, or otherwise include, diffusion models. As described herein, diffusion models generally refer to generative machine-learned models that work to generate audio by iteratively denoising random noise. For example, the input to a diffusion model can be a conditioning signal c, a randomly sampled time step t and a sample $x_t$ obtained by corrupting the original sample x via a normal or Gaussian diffusion process with a noise schedule parameterized by the standard deviation $\sigma_t$ of the noise at time t. The range of time t can be set to [0,1] from which uniform sampling can occur during training.

The distribution of $x_t$ can be parameterized by a single noise vector $\epsilon$ that belongs to a standard normal distribution, as $x_t$ may be written as a function of the original sample, the deterministic noise schedule, and the noise vector $\epsilon$ such that $x_t(x, \epsilon, \sigma)$. The loss function used to train the models 120 can be defined as $\mathbb{E}_{x,c,\epsilon,t}[w_t \| \epsilon_\theta(x_t, c, t) - \epsilon \|^2]$, where $w_t$ represents a fixed weight function that can serve, or be viewed as, a hyperparameter. Training of the models 120 and/or 140 will be discussed in greater detail with regards to model trainer 160.

In some implementations, the user computing device 102 can utilize the models 120 by taking random noise at time t=1 (e.g., via an audio sampler capable of sampling random audio, etc.) and denoising the random noise based on noise predictions provided by the model 120. For example, ancestral sampling can be utilized to control the quality of the generated audio data. For example, the degree of stochasticity of the denoising process can be controlled by adjusting a stochasticity parameter $\gamma$ of the audio sampler. Other examples include denoising step size (e.g., how often denoising occurs), variance schedule, loss weight, etc.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120, or single set of models 120 (e.g., to perform parallel generation of audio data from textual prompts across multiple instances of model or set of model(s)).

More particularly, in some implementations, the model(s) 120 can include a large language model (LLM). The LLM can be utilized to generate descriptive sentences of music (e.g., generic descriptive sentences of many different types of audio data). The model(s) 120 can include a machine-learned audio classification model. The model(s) 120 can include a machine-learned generation model (e.g., a diffusion model, etc.), and a machine-learned diffusion model. The machine-learned generation model and the machine-learned diffusion model can be utilized in conjunction to generate high-quality audio data based on textual content. For example, a user of the user computing device 102 can provide textual content that includes a query for a particular type of music (e.g., with the user input component 122, etc.). The user computing device can process the textual content with the machine-learned generative model of the model(s) 120 to obtain an intermediate representation of the textual content. The user computing device 102 can then process the intermediate representation with the machine-learned diffusion model of the model(s) 120 to obtain high-quality audio that corresponds to the query.

Additionally or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service (e.g., a audio generation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, audio samples, a corpus of textual content, audio recordings, etc. More specifically, for example, the training data can include audio samples and corresponding descriptive text from an audiovisual hosting entity (e.g., a video hosting site, etc.). For example, the audio samples can be extracted from music videos, and the descriptive text can be extracted from the textual content provided by users for the music video. The model trainer 160 can train a machine-learned audio classification model of the model(s) 120/140 with the audio samples and descriptive textual content.

The training data 162 can also include a corpus of textual data generated using an LLM of the model(s) 120/140. The training data 162 can include a large number of audio recordings. The model trainer 160 can train the machine-learned generation model and the machine-learned diffusion model of the model(s) 120/140 with the audio recordings and the corpus of textual data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
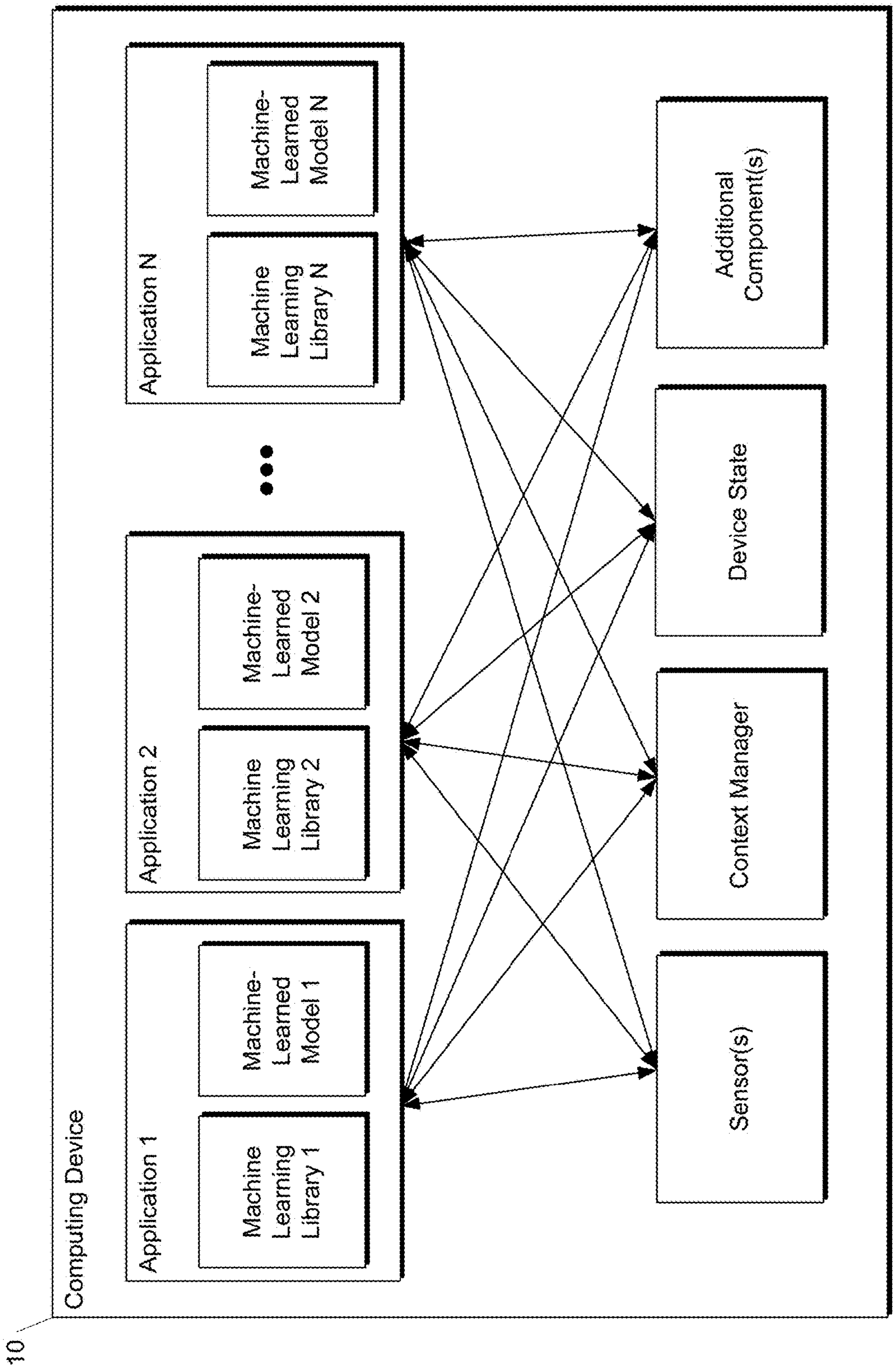
FIG. 1B depicts a block diagram of an example computing device that performs high-quality generation of audio data conditioned on a textual prompt according to example embodiments of the present disclosure.

FIG. 1B depicts a block diagram of an example computing device 10 that performs high-quality generation of audio data conditioned on a textual prompt according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
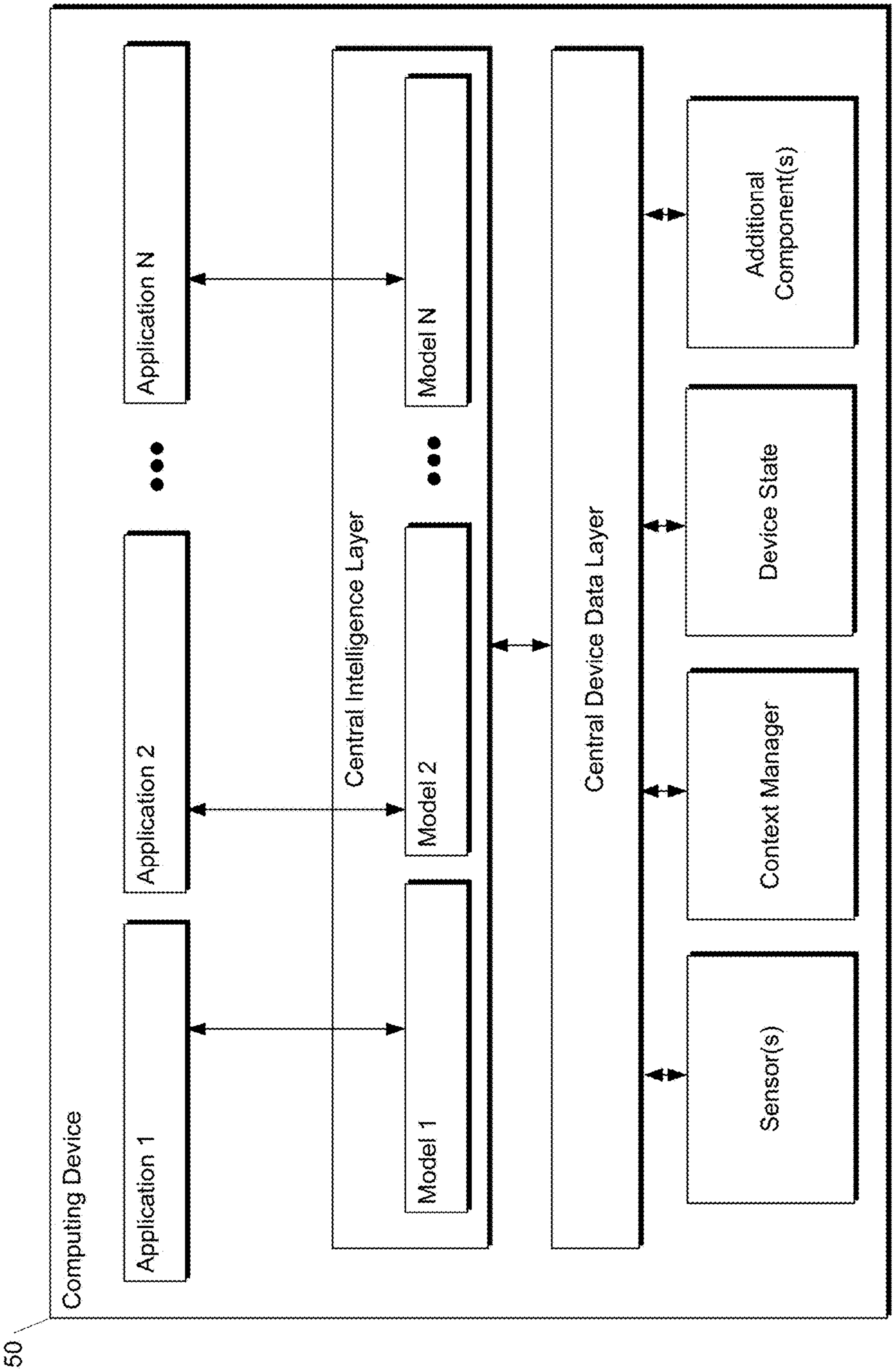
FIG. 1C depicts a block diagram of an example computing device that performs training of machine-learned models for generation of high-quality audio data according to example embodiments of the present disclosure.

FIG. 1C depicts a block diagram of an example computing device 50 that performs training of machine-learned models for generation of high-quality audio data according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
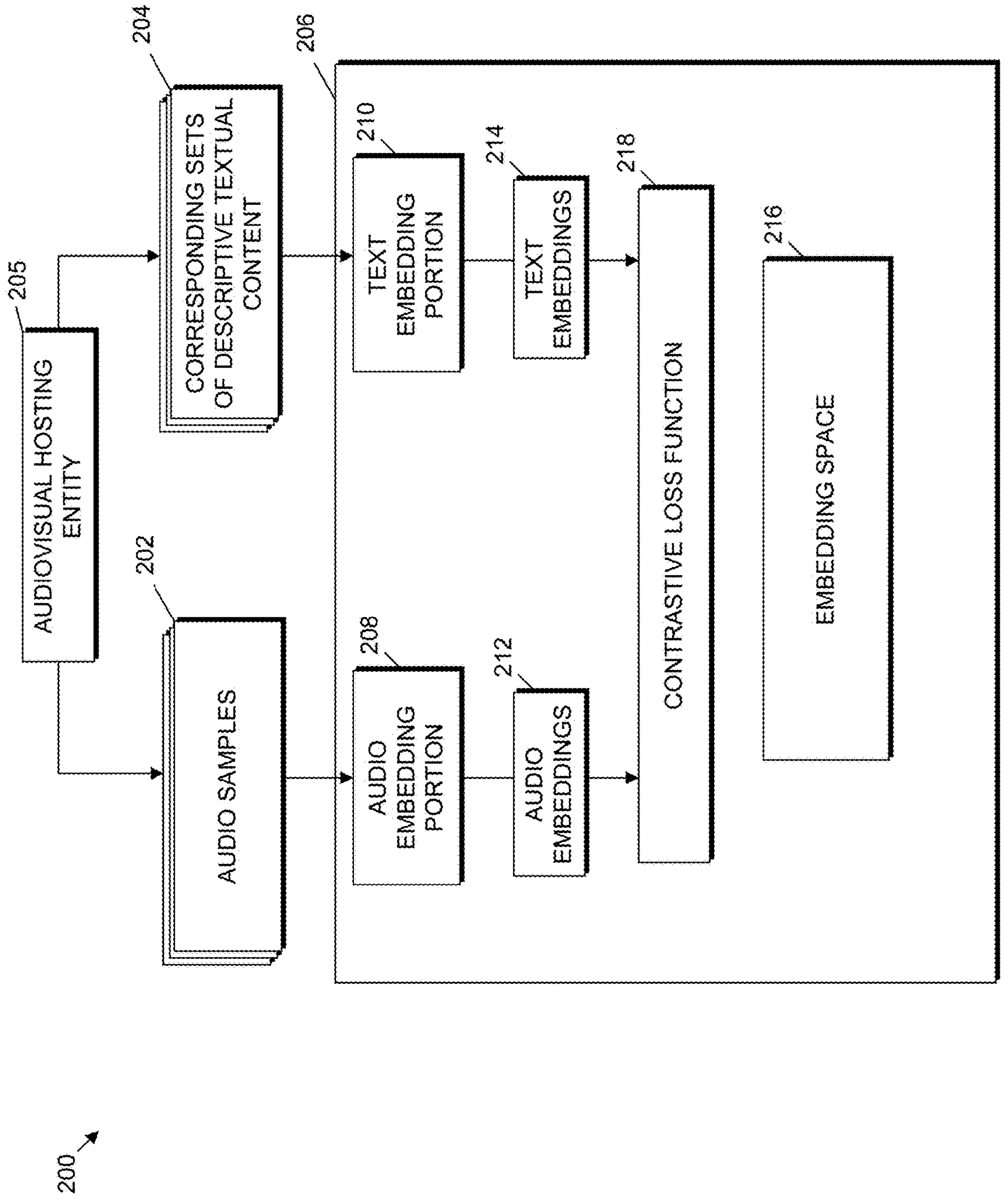
FIG. 2 depicts a data flow diagram for training a joint audio-text embedding model for audio classification according to example embodiments of the present disclosure.

FIG. 2 depicts a data flow diagram 200 for training a joint audio-text embedding model for audio classification according to example embodiments of the present disclosure. More specifically, a computing system (e.g., training computing system 150 of FIG. 1A, etc.) can obtain audio samples 202 and corresponding sets of descriptive textual content 204 from an audiovisual hosting entity 205 (e.g., a video hosting site, etc.). For example, the audio samples 202 can be sampled from music videos hosted by the audiovisual hosting entity, and the corresponding sets of descriptive textual content 204 can be comments, titles, descriptions, etc. provided for the corresponding music video by users of the audiovisual hosting entity.

The computing system can train a machine-learned audio classification model 206 (e.g., a joint audio-text embedding model) with the audio samples 202 and the corresponding sets of textual content 204. More specifically, the computing system can process the audio samples 202 with an audio embedding portion 208 of the machine-learned audio classification model 206 to obtain audio embeddings 212. The computing system can process the sets of descriptive textual content 204 with a text embedding portion 210 of the machine-learned audio classification model 206 to obtain text embeddings 214. The computing system can evaluate the audio embeddings 212 and the text embeddings 214 within an embedding space 216 using a contrastive loss function 218. Based on the differences, the computing system can train the machine-learned audio classification model 206.

Figure 3:
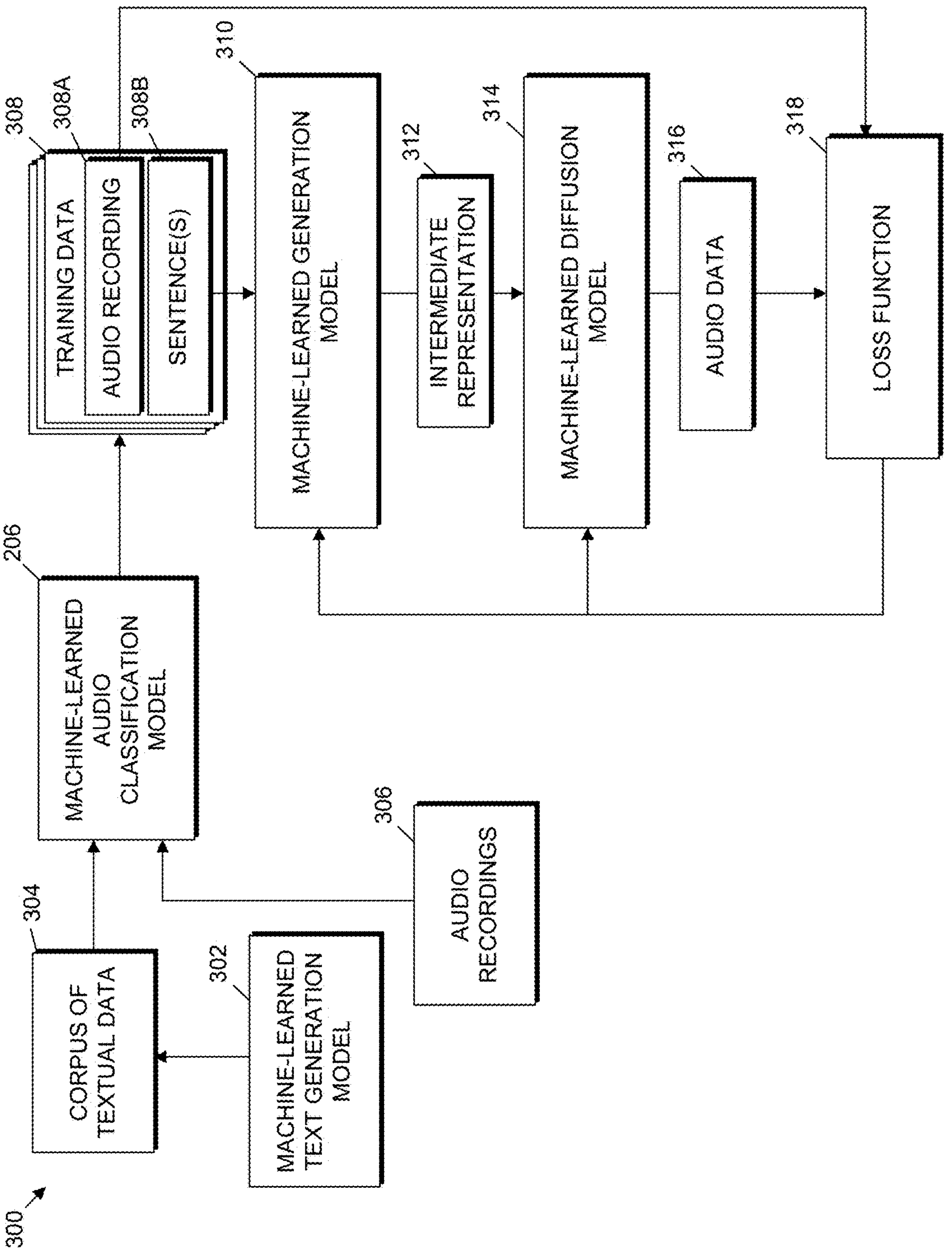
FIG. 3 depicts a data flow diagram for training a machine-learned generation model and a machine-learned diffusion model for generation of high-quality audio data conditioned on textual prompts according to example embodiments of the present disclosure.

FIG. 3 depicts a data flow diagram 300 for training a machine-learned generation model and a machine-learned diffusion model for generation of high-quality audio data conditioned on textual prompts according to example embodiments of the present disclosure. More specifically, a computing system (e.g., the training computing system 150 of FIG. 1A, etc.) can utilize a machine-learned text generation model 302 (e.g., a conventional large language model) to generate a corpus of textual data 304. The corpus of textual data 304 can include a plurality of sentences. The sentences can generically describe various types of audio data, characteristics of audio data, etc. For example, if the desired type of audio data is music, the corpus of textual data 304 can include sentences generically descriptive of music (e.g., "some types of music utilize synths, violins, piano, drums, and vocals!"). The computing system can also obtain a series of audio recordings 306. The audio recordings 306 can be any type or manner of audio recording desired for training of the models. For example, the audio recordings 306 can be 30-second clips of music.

The audio recordings 306 and the corpus of textual data 304 can be processed using the machine-learned audio classification model 206 (e.g., as described with regards to FIG. 2) to obtain training data 308. The training data 308 can include a number of training pairs that each include an audio recording 308A and descriptive sentence(s) 308B that most accurately describe the audio recording 308A. More specifically, the machine-learned audio classification model 206 can be utilized to evaluate the corpus of textual data 304 with regards to the audio recordings 306 within an embedding space of the machine-learned audio classification model 206. By doing so, the computing system can determine the sentence(s) that most accurately describe each audio recording 306. For example, for a training pair of the training data 308, the sentences 308B of the training pair would be those closest to the audio recording 308A within the embedding space of the machine-learned audio classification model 206.

The computing system can process the sentence(s) 308B with a machine-learned generation model 310. The machine-learned generation model 310 can be any type or manner of generative model. For example, the machine-learned generation model 310 can be a diffusion model, or cascaded diffusion model. The machine-learned generation model 310 can output an intermediate representation 312 of the sentences 308B. The intermediate representation 312 can be any type of intermediate representation (e.g., a low-fidelity audio sample, a spectrogram, an embedding, a latent representation, etc.). For example, the sentence(s) 308B can be vectorized and fed to the machine-learned generation model 310 as a cross-attention sequence. As an output, the machine-learned generation model 310 can output the intermediate representation 312, which can be or otherwise include a "low-fidelity" (e.g., ~3 kHz) audio signal.

The computing system can process the intermediate representation 312 with a machine-learned diffusion model 314. The machine-learned diffusion model 314 (e.g., a cascaded diffusion model) can output audio data 316. It should be noted that the audio data 316 can be any type or manner of audio data (e.g., an .mp3 file, raw audio data, 16 kHz audio, etc.). To follow the previous example, the machine-learned diffusion model can process the intermediate representation 312 (e.g., the "low-fidelity" audio) and can output audio data 316 that includes audio that is higher fidelity (e.g., ~16 kHz) than the low-fidelity audio of the intermediate representation 312. In some implementations, the machine-learned diffusion model 314 can up-sample the intermediate representation 312 to generate the audio data 316. For example, the machine-learned diffusion model 314 can up-sample 3 kHz audio included in the intermediate representation 312 by applying Fast Fourier Transforms (FFTs) to the audio sequence and then applying inverse FFT to obtain higher fidelity audio based on the lower fidelity Fourier coefficients.

Alternatively, in some implementations, the machine-learned generation model 310 can be a spectrogram model trained to generate a spectrogram representation of audio based on the input data (e.g., vectorized representations of the sentence(s) 308B, etc.). For example, the intermediate representation 312 can be a spectrogram that includes ~80 channels with a frequency of ~100 features per second. In some implementations, the pixel values of the spectrogram can be normalized to lie within [−1,1]. Similarly, in some implementations, the machine-learned diffusion model 314 can be or otherwise include a vocoder model that can process the spectrogram to generate the higher-fidelity audio. In some implementations, rather than processing the intermediate representation 312 conditioned on the sentence(s) 308B, or the corpus of textual data 304, the machine-learned diffusion model 314 can exclusively process the spectrogram (e.g., the intermediate representation 312) to generate the audio data 316.

In some implementations, both the generation model 310 and the diffusion model 314 can both be, or otherwise include, diffusion model(s), diffusion layer(s), or analogous layer(s) conventionally included in diffusion models or similar.

The computing system can evaluate a difference between the audio data 316 and the audio recording 308A of the training data 308 using loss function 318. Based on the difference, the computing system can adjust the values of one or more parameters of the machine-learned diffusion model 314. Further, in some implementations, the computing system can also adjust the values of one or more parameters of the machine-learned generation model 310 in an end-to-end manner. In such fashion, the computing system can train the machine-learned generation model 310 and the machine-learned diffusion model 314 to collectively generate high-quality audio data 316 from textual content (e.g., sentence(s) 308B).

Figure 4:
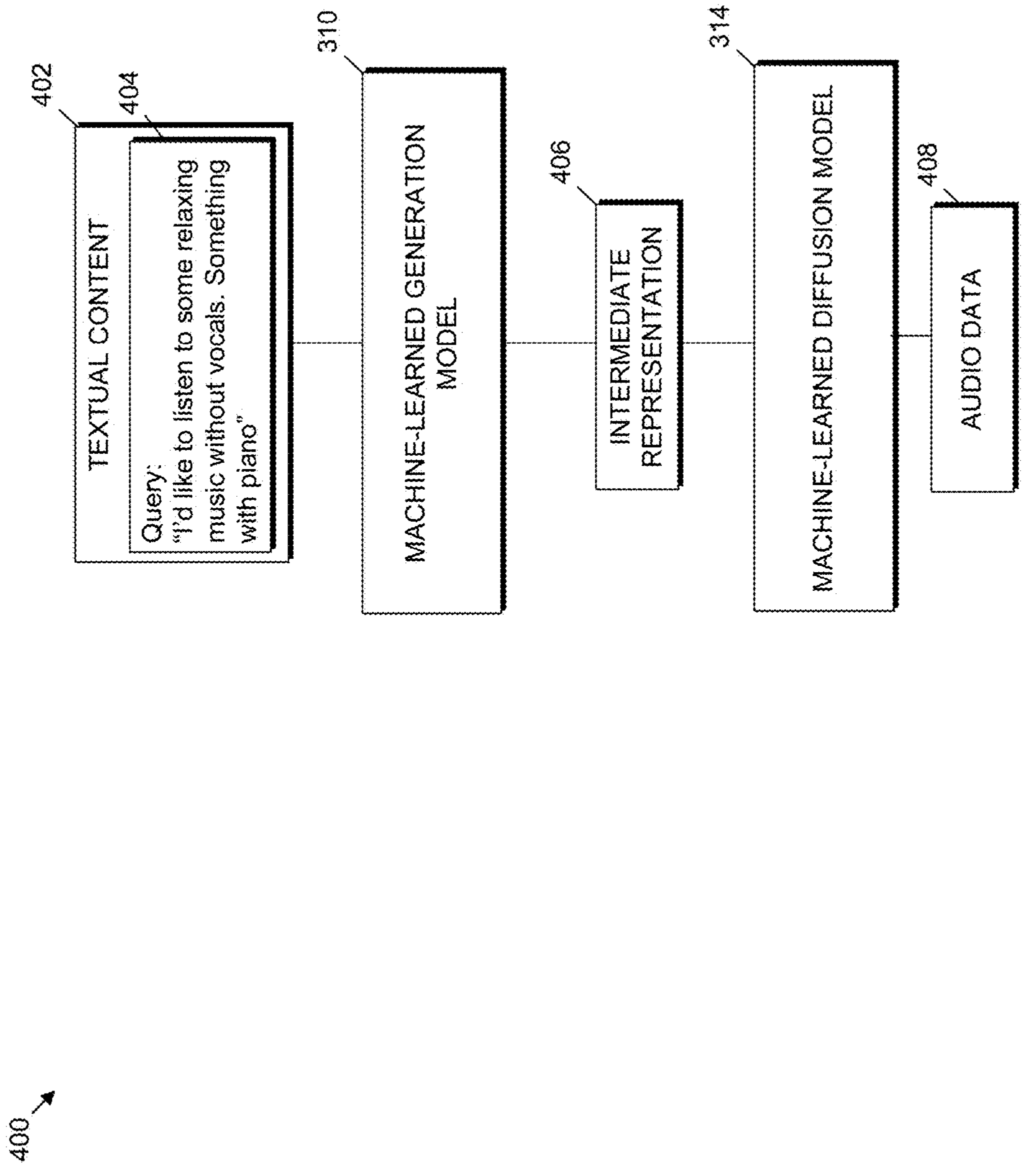
FIG. 4 depicts a data flow diagram for generating high-quality audio from a textual prompt using a machine-learned generation model and a machine-learned diffusion model collectively trained for generation of high-quality audio data according to example embodiments of the present disclosure.

FIG. 4 depicts a data flow diagram 400 for generating high-quality audio from a textual prompt using a machine-learned generation model and a machine-learned diffusion model collectively trained for generation of high-quality audio data according to example embodiments of the present disclosure. Specifically, a computing system (e.g., server computing system 130 of FIG. 1A, etc.) can obtain textual content 402. The textual content 402 can describe a query 404 that indicates a desired type of audio content. To follow the depicted example, the query 404 can indicate a desire for "relaxing music without vocals . . . something with piano". The machine-learned generation model 310 can process the textual content 402 to obtain an intermediate representation 406 (e.g., as described with regards to FIG. 3), and the machine-learned diffusion model 314 can process the intermediate representation to obtain audio data 408. The audio data 408 can be, for example, 30 seconds of music without vocals that includes piano instrumentals. In such fashion, the machine-learned generation model 310 and the machine-learned diffusion model 314 can, in conjunction, generate audio data that semantically matches the requests described by the textual content 402.

Figure 5:
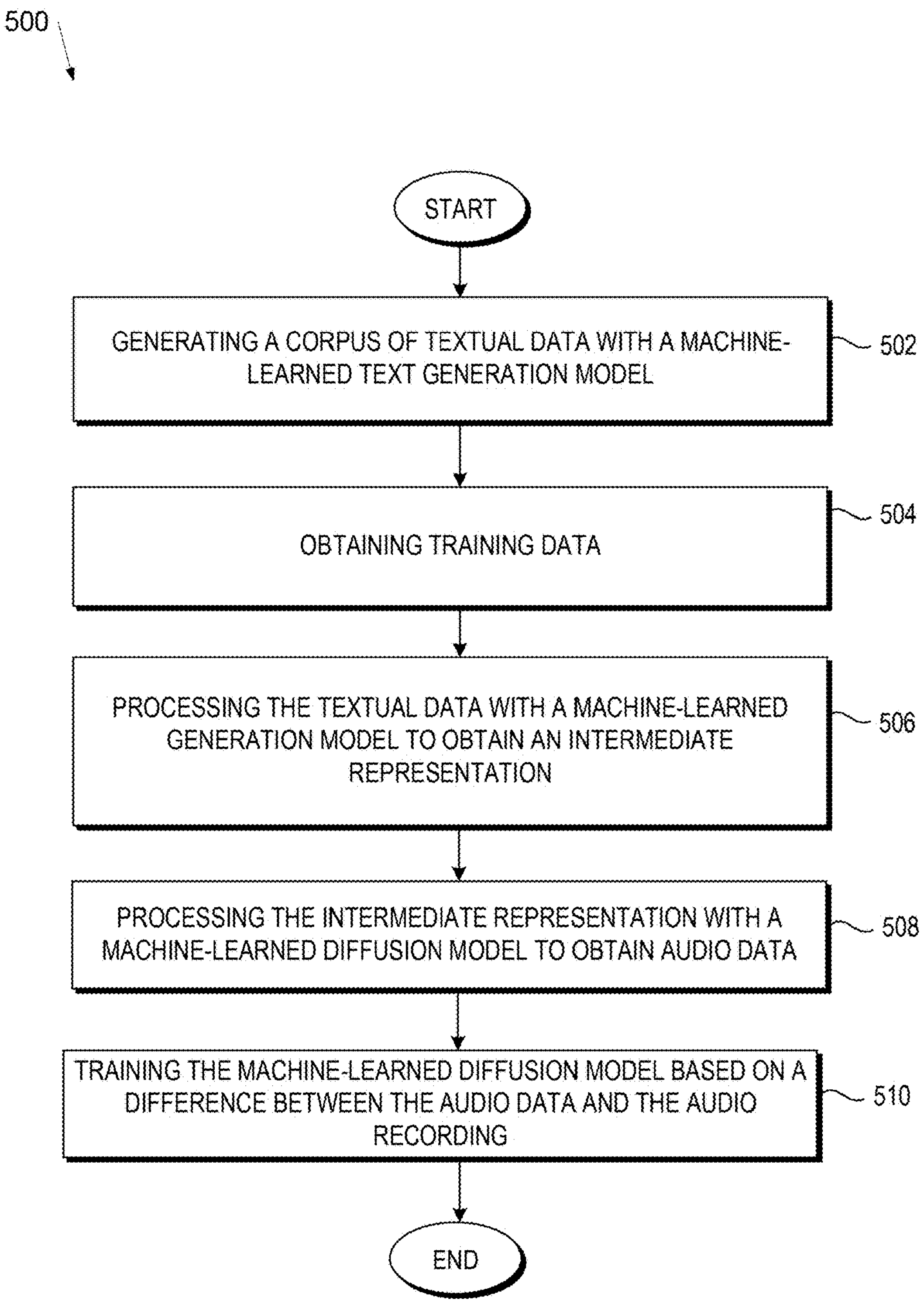
FIG. 5 depicts a flow chart diagram of an example method to perform training of a machine-learned diffusion model for generation of high-quality audio data according to example embodiments of the present disclosure.

FIG. 5 depicts a flow chart diagram of an example method 500 to perform training of a machine-learned diffusion model for generation of high-quality audio data according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can generate a corpus of textual data with a machine-learned text generation model. The corpus of textual data can include a plurality of sentences. Each sentence can be descriptive of a type of audio.

At 504, the computing system can obtain a plurality of audio recordings. In some implementations, the audio recordings can be sampled from various music recordings. For example, the plurality of audio recordings can be 10-second, 20-second, 30-second, etc. clips of from various songs. The computing system can, for each of the plurality of audio recordings, process the audio recording with a machine-learned audio classification model to obtain training data. The training data can include the audio recording and one or more sentences of the plurality of sentences closest to the audio recording within a joint audio-text embedding space of the machine-learned audio classification model.

In some implementations, prior to processing the audio recording with a machine-learned audio classification model, the computing system can obtain a plurality of audio samples and an associated corpus of descriptive textual data from an audiovisual data hosting entity. The corpus of descriptive textual data can include, for each of the plurality of audio samples, one or more portions of textual content provided by users of the audiovisual data hosting entity to describe the audio recording. The computing system can, for each of the plurality of audio samples, process the audio sample with an audio embedding portion of the machine-learned audio classification model to obtain an audio embedding. The computing system can then process the one or more portions of textual content that describe the audio recording with a text embedding portion of the machine-learned audio classification model to obtain a text embedding, and train the machine-learned audio classification model using a contrastive loss function that evaluates a difference between the audio embedding and the text embedding.

At 506, the computing system can process the one or more sentences with a machine-learned generation model to obtain an intermediate representation of the one or more sentences.

At 508, the computing system can process the intermediate representation with a machine-learned cascaded diffusion model to obtain audio data. In some implementations, processing the intermediate representation with the machine-learned cascaded diffusion model can include applying a Gaussian diffusion process to the audio recording, and processing the audio recording and a conditioning signal with the machine-learned cascaded diffusion model to obtain the audio data.

In some implementations, the intermediate representation of the textual content can be a spectrogram, and the computing system can process the spectrogram and with the machine-learned diffusion model to obtain the audio data. Alternatively, in some implementations, the intermediate representation of the textual content comprises a low-fidelity audio signal, and the computing system can process the low-fidelity audio signal and the textual content with the machine-learned diffusion model to obtain the audio data.

At 510, the computing system can train the machine-learned cascaded diffusion model based on a difference between the audio data and the audio recording. In some implementations, the computing system can train the machine-learned generation model and the machine-learned cascaded diffusion model based on the difference between the audio data and the audio recording.

In some implementations, the computing system can further obtain, by the textual content that describes a query. The query can indicate a desired type of audio content. The computing system can process the textual content with the machine-learned generator model to generate an intermediate representation of the textual content, and process the intermediate representation with the machine-learned diffusion model to obtain audio data. The audio data can include audio of the desired type of audio content.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:

one or more processors; and one or more non-transitory computer-readable media that store instructions that, when executed by the one or more processors, cause the computing system to perform operations, the operations comprising:

obtaining a plurality of audio samples and an associated corpus of descriptive textual data from an audiovisual data hosting entity, wherein the corpus of descriptive textual data comprises, for each of the plurality of audio samples, one or more portions of textual content that are provided by users of the audiovisual data hosting entity responsive to the audio sample, wherein the one or more portions of textual content comprise comments;

for each audio sample of the plurality of audio samples:

processing the audio sample with an audio embedding portion of a machine-learned audio classification model to obtain an audio embedding;

processing the one or more portions of textual content that describe the audio sample with a text embedding portion of the machine-learned audio classification model to obtain a text embedding; and training the machine-learned audio classification model based on a contrastive loss function that evaluates a difference between the audio embedding and the text embedding:

processing a query comprising textual content that indicates a desired type of audio content with a machine-learned generator model to generate an intermediate representation of the textual content of the query; and processing the intermediate representation of the textual content with a machine-learned diffusion model to obtain audio data, wherein the audio data comprises audio of the desired type of audio content.

2. The computing system of claim 1, wherein the operations further comprise:

training the machine-learned diffusion model based on a loss function that evaluates a difference between the audio data and ground-truth audio data comprising ground-truth audio of the desired type of audio content.

3. The computing system of claim 1, wherein the machine-learned diffusion model comprises a machine-learned cascaded diffusion model comprising one or more attention mechanisms.

4. The computing system of claim 3, wherein the intermediate representation of the textual content comprises a low-fidelity audio signal; and wherein processing the intermediate representation with the machine-learned diffusion model comprises processing the low-fidelity audio signal and the textual content of the query with the machine-learned diffusion model to obtain the audio data.

5. The computing system of claim 1, wherein the intermediate representation of the textual content comprises a spectrogram;

wherein processing the intermediate representation with the machine-learned diffusion model comprises processing the spectrogram with the machine-learned diffusion model to obtain the audio data; and wherein processing the textual content with the machine-learned generator model further comprises:

applying a Gaussian diffusion process to the intermediate representation.

6. The computing system of claim 1, wherein, prior to processing textual content of the query with the machine-learned generator model, the operations comprise:

generating a corpus of textual data with a machine-learned language model, wherein the corpus of textual data comprises a plurality of sentences, and wherein each sentence is descriptive of a type of audio;

for each of a plurality of audio recordings:

processing the audio recording with the machine-learned audio classification model to identify one or more of the plurality of sentences located closest to the audio recording within a joint audio-text embedding space of the machine-learned audio classification model; and processing, by the computing system, the one or more of the plurality of sentences with a machine-learned generator model to obtain an intermediate representation of the one or more of the plurality of sentences.

7. The computing system of claim 6, wherein processing the one or more of the plurality of sentences with the machine-learned generator model to obtain the intermediate representation of the one or more of the plurality of sentences comprises:

training at least one of the machine-learned generator model or the machine-learned diffusion model with a training example comprising the audio recording and the one or more of the plurality of sentences.

8. A computer-implemented method, comprising:

obtaining, by a computing system comprising one or more computing devices, a plurality of audio samples and an associated corpus of descriptive textual data from an audiovisual data hosting entity, wherein the corpus of descriptive textual data comprises, for each of the plurality of audio samples, one or more portions of textual content that are provided by users of the audiovisual data hosting entity responsive to the audio sample, wherein the one or more portions of textual content comprise comments;

for each audio sample of the plurality of audio samples:

processing, by the computing system, the audio sample with an audio embedding portion of a machine-learned audio classification model to obtain an audio embedding;

processing, by the computing system, the one or more portions of textual content that describe the audio sample with a text embedding portion of the machine-learned audio classification model to obtain a text embedding; and training, by the computing system, the machine-learned audio classification model based on a contrastive loss function that evaluates a difference between the audio embedding and the text embedding;

processing a query comprising textual content that indicates a desired type of audio content with a machine-learned generator model to generate an intermediate representation of the textual content of the query; and processing the intermediate representation of the textual content with a machine-learned diffusion model to obtain audio data, wherein the audio data comprises audio of the desired type of audio content.

9. The computer-implemented method of claim 8, wherein the machine-learned diffusion model comprises a machine-learned cascaded diffusion model comprising one or more attention mechanisms.

10. The computer-implemented method of claim 9, wherein the intermediate representation of the textual content comprises a low-fidelity audio signal; and wherein processing the intermediate representation with the machine-learned diffusion model comprises:

processing, by the computing system, the low-fidelity audio signal and the textual content of the query with the machine-learned diffusion model to obtain the audio data.

11. The computer-implemented method of claim 8, wherein the intermediate representation of the textual content comprises a spectrogram;

wherein processing the intermediate representation with the machine-learned diffusion model comprises processing, by the computing system, the spectrogram with the machine-learned diffusion model to obtain the audio data; and wherein processing the textual content with the machine-learned generator model further comprises:

applying, by the computing system, a Gaussian diffusion process to the intermediate representation.

12. One or more non-transitory computer-readable media that store instructions that, when executed by one or more processors, cause the one or more processors to perform operations, the operations comprising:

obtaining a plurality of audio samples and an associated corpus of descriptive textual data from an audiovisual data hosting entity, wherein the corpus of descriptive textual data comprises, for each of the plurality of audio samples, one or more portions of textual content that are provided by users of the audiovisual data hosting entity responsive to the audio sample, wherein the one or more portions of textual content comprise comments;

for each audio sample of the plurality of audio samples:

processing the audio sample with an audio embedding portion of a machine-learned audio classification model to obtain an audio embedding;

processing the one or more portions of textual content that describe the audio sample with a text embedding portion of the machine-learned audio classification model to obtain a text embedding; and training the machine-learned audio classification model based on a contrastive loss function that evaluates a difference between the audio embedding and the text embedding;

processing a query comprising textual content that indicates a desired type of audio content with a machine-learned generator model to generate an intermediate representation of the textual content of the query; and processing the intermediate representation of the textual content with a machine-learned diffusion model to obtain audio data, wherein the audio data comprises audio of the desired type of audio content.

13. The one or more non-transitory computer-readable media of claim 12, wherein the operations further comprise:

training the machine-learned diffusion model based on a loss function that evaluates a difference between the audio data and ground-truth audio data comprising ground-truth audio of the desired type of audio content.

14. The computer-implemented method of claim 8, further comprising:

prior to processing textual content of the query with the machine-learned generator model, generating a corpus of textual data with a machine-learned language model, wherein the corpus of textual data comprises a plurality of sentences, and wherein each sentence is descriptive of a type of audio;

for each of a plurality of audio recordings:

processing the audio recording with the machine-learned audio classification model to identify one or more of the plurality of sentences located closest to the audio recording within a joint audio-text embedding space of the machine-learned audio classification model; and processing, by the computing system, the one or more of the plurality of sentences with a machine-learned generator model to obtain an intermediate representation of the one or more of the plurality of sentences.

15. The computer-implemented method of claim 9, wherein the method further comprises:

training, by the computing system, the machine-learned cascaded diffusion model based on a loss function that evaluates a difference between the audio data and ground-truth audio data comprising ground-truth audio of the desired type of audio content.

16. The one or more non-transitory computer-readable media of claim 12, wherein the machine-learned diffusion model comprises a machine-learned cascaded diffusion model comprising one or more attention mechanisms.

17. The one or more non-transitory computer-readable media of claim 16, wherein the intermediate representation of the textual content comprises a low-fidelity audio signal; and wherein processing the intermediate representation with the machine-learned diffusion model comprises processing the low-fidelity audio signal and the textual content of the query with the machine-learned diffusion model to obtain the audio data.

18. The one or more non-transitory computer-readable media of claim 12, wherein the intermediate representation of the textual content comprises a spectrogram;

wherein processing the intermediate representation with the machine-learned diffusion model comprises processing the spectrogram with the machine-learned diffusion model to obtain the audio data; and wherein processing the textual content with the machine-learned generator model further comprises:

applying a Gaussian diffusion process to the intermediate representation.

19. The one or more non-transitory computer-readable media of claim 12, wherein, prior to processing textual content of the query with the machine-learned generator model, the operations comprise:

generating a corpus of textual data with a machine-learned language model, wherein corpus of textual data comprises a plurality of sentences, and wherein each sentence is descriptive of a type of audio;

for each of a plurality of audio recordings:

processing the audio recording with the machine-learned audio classification model to identify one or more of the plurality of sentences located closest to the audio recording within a joint audio-text embedding space of the machine-learned audio classification model; and processing the one or more of the plurality of sentences with a machine-learned generator model to obtain an intermediate representation of the one or more of the plurality of sentences.

20. The one or more non-transitory computer-readable media of claim 19, wherein processing the one or more of the plurality of sentences with the machine-learned generator model to obtain the intermediate representation of the one or more of the plurality of sentences comprises:

training at least one of the machine-learned generator model or the machine-learned diffusion model with a training example comprising the audio recording and the one or more of the plurality of sentences.

* * * * *